United States Patent
Petrac et al.

(10) Patent No.: US 9,126,685 B2
(45) Date of Patent: Sep. 8, 2015

(54) REGULATING SYSTEM FOR THE CABIN PRESSURE OF AN AIRPLANE AND METHOD FOR REGULATING THE CABIN PRESSURE OF AN AIRPLANE

(75) Inventors: Markus Petrac, Deinste (DE); Ugur Akin, Hamburg (DE)

(73) Assignee: Airbus Operations GmbH (DE)

( * ) Notice: Subject to any disclaimer, the term of this patent is extended or adjusted under 35 U.S.C. 154(b) by 693 days.

(21) Appl. No.: 13/432,494

(22) Filed: Mar. 28, 2012

(65) Prior Publication Data

US 2012/0196520 A1 Aug. 2, 2012

Related U.S. Application Data

(63) Continuation of application No. PCT/EP2010/064158, filed on Sep. 24, 2010.

(60) Provisional application No. 61/246,257, filed on Sep. 28, 2009.

(30) Foreign Application Priority Data

Sep. 28, 2009 (DE) .......................... 10 2009 043 323

(51) Int. Cl.
  *B64D 13/02* (2006.01)
  *B64D 13/00* (2006.01)
  *B64D 13/04* (2006.01)

(52) U.S. Cl.
  CPC ............... *B64D 13/00* (2013.01); *B64D 13/04* (2013.01)

(58) Field of Classification Search
  CPC ................... B64D 13/02; B64D 13/04; B64D 2700/62026; B64D 2700/62035; B64D 13/00

USPC .................... 454/70, 71, 72, 73, 74, 75, 76
  See application file for complete search history.

(56) References Cited

U.S. PATENT DOCUMENTS 3,376,803 A   4/1968   Emmons
3,473,460 A  10/1969   Emmons (Continued)

FOREIGN PATENT DOCUMENTS

CN   1386103 A    12/2002
GB   1247624 A     9/1971
WO   2004102636 A2 11/2004

*Primary Examiner* — Gregory Huson
*Assistant Examiner* — Dana Tighe
(74) *Attorney, Agent, or Firm* — Lerner, David, Littenberg, Krumholz & Mentlik, LLP

(57) ABSTRACT

A regulating system for the regulation of the cabin pressure $P_C$ of an aircraft, includes at least one cabin pressure regulator unit, which is so configured that, by controlling at least one air outflow or air inflow device of the aircraft, it can set the cabin pressure $P_c$ within the aircraft fuselage with the latter supplied with fresh air and subjected to pressure at a pressure level or a cabin height defined by the cabin regulator unit. If there are changes to be made to the pressure level or the cabin height, for example while the aircraft is climbing or descending, the cabin regulator unit maintains the quotient of the time-related change of the cabin pressure $P_c$ in the aircraft cabin and the cabin pressure $P_c$ constant. The result is that the gas expansion rate, or the gas compression rate in a passenger's middle ear, remains constant, so that during the entire climbing or descending stage no varying or increasing discomfort is experienced by the passengers.

7 Claims, 3 Drawing Sheets

(56) References Cited

U.S. PATENT DOCUMENTS

| | | |
|---|---|---|
| 4,553,474 A | 11/1985 | Wong et al. |
| 5,186,681 A | 2/1993 | Emmons |
| 6,676,504 B2 | 1/2004 | Petri et al. |
| 2004/0102150 A1 | 5/2004 | Horner |
| 2007/0102576 A1 | 5/2007 | McCoy et al. |
| 2007/0169624 A1* | 7/2007 | Saito et al. ............ 95/139 |

* cited by examiner

REGULATING SYSTEM FOR THE CABIN PRESSURE OF AN AIRPLANE AND METHOD FOR REGULATING THE CABIN PRESSURE OF AN AIRPLANE

CROSS-REFERENCE TO RELATED APPLICATIONS

This application is a continuation of International Application No. PCT/EP2010/064158, filed Sep. 24, 2010, which claims the benefit of the filing date of U.S. Provisional Patent Application No. 61/246,257, filed Sep. 28, 2009, and of German Patent Application No. 10 2009 043 323.6, filed Sep. 28, 2009, the disclosures of which applications are hereby incorporated herein by reference.

TECHNICAL FIELD

The invention relates to a cabin pressure regulating system for an aircraft and also to a method for regulating the cabin pressure of an aircraft.

BACKGROUND TO THE INVENTION

Large modern aircraft on scheduled air routes usually fly at great heights and require a pressurised cabin to ensure the wellbeing and the comfort of passengers. In order to reduce the mechanical loading on the aircraft hull, the pressure in the cabin is significantly lower than that at ground level, representing an atmospheric air pressure of heights between 2,000 and 3,000 m. The height above sea level corresponding to a respective cabin pressure is often described as the "cabin height".

In all operational phases, the cabin pressure is brought in each case by means of a cabin pressure regulating system to a predetermined level, which is determined after taking account of the load on the aircraft fuselage from the differential pressure between the cabin and the environment and the safety and the wellbeing of the passengers, which requires in particular an adequate supply of oxygen. In this context, it is also important to note that the pressure in the cabin is reduced during climbing in relation to the pressure on the ground and then increased again as the aircraft descends in relation to the pressure on the ground. According to the present state of the art, it is widely assumed that a constant cabin pressure rate could be the most appropriate for passenger comfort. Consequently, in modern aircraft, the cabin pressure regulation is based on a constant pressure rate for both ascending and descending.

However, it can be regularly observed in current aircraft on scheduled flights, that during both climbing and descending the pressure on passengers' eardrums or ears is in fact not constant and that the cabin pressure setting can even result in increasing discomfort for passengers.

SUMMARY OF THE INVENTION

The object of the present invention may therefore be regarded as proposing a cabin pressure regulating system, in which the strain on the human ear is as constant as possible during both climbing and descending so that passengers' discomfort can be minimised.

A further object of the present invention may be seen as proposing such a cabin pressure regulating system that can be operated using existing hardware in a modern scheduled aircraft without any costly modifications being required.

This object is achieved by a system for regulating the cabin pressure of an aircraft with the features of Claim 1. Advantageous further developments can be found in the subsequent claims.

A system in accordance with the present invention to regulate the cabin pressure of an aircraft may comprise a cabin pressure regulating unit that is configured in such a way that, by controlling an air outlet or inlet device of the aircraft, the momentary air pressure $P_C$ within the fuselage of an aircraft, where this is provided with fresh air and subjected to pressure, can be set at a level predetermined for the cabin pressure regulator unit. This is set up in such a way that, if pressure adjustments have to be made, the quotients from the times of changing the absolute pressure $P_C$ in the aircraft cabin and the absolute pressure $P_C$ are kept constant.

The term "air outflow or air inflow device" covers any form of appliance or device that can be used to maintain the pressure within a ventilated area, into which fresh air is regularly introduced and from which used air is regularly extracted. In the example of an aircraft cabin, the regulation can be effected by regulating both the inflow of fresh air and the outflow of used air, whereby the air inflow and the air outflow can be used at the same time in order to regulate the air pressure. Particularly suitable devices for this purpose are outflow valves and in the same way the inflow of ram air and the bleed air that is prepared by the air conditioning system can be regulated so as to influence the pressure within the cabin. However, the present invention is not restricted to the use of a specific air inflow or air outflow device.

The technical advantages of these features are explained as follows. The central element that is responsible for a passenger's discomfort during a pressure build-up or a pressure drop is the human ear. The organ of the human body that is the most sensitive to pressure is the middle ear. This is shaped in such a way that a partially closed cavity in the form of the middle ear is limited on one side by the eardrum in the form of a membrane and on the other by a tubular connection in the form of the eustachian tube which connects with the back of the nose. In the event of variations of pressure, the gas contained in the inner ear expands or contracts, so that the eardrum starts to react in a concave or a convex reaction. This movement of the eardrum across the ossicle is perceived at the cochlea as being unpleasant and even on occasions painful. Because of the anatomical configuration, the very gradual pressure equalisation effect in the middle ear through the eustachian tube can be accelerated by yawning, swallowing and the like. In general, the relative volume expansion of a gas enclosed in a restricted space is, according to Boyle's Law, inversely proportional to the proportion of the initial pressure and the final pressure. Because of the water vapour saturation of the inner ear, the partial pressure of water vapour is to be included in this consideration. From this, it follows that the relative gas expansion at a constant pressure difference is lower at a high absolute pressure level than at a low pressure level.

The volume contained within the middle ear is thus at first initially relatively strongly compressed by a conventional cabin pressure regulation with a linear pressure change while descending, while the compression rate reduces in relation to the increasing absolute cabin pressure. In the same way, the expansion rate of the volume enclosed with the inner ear increases in relation to the increasing height when climbing. Because of the indication by the management unit that the quotient of the time-related pressure change and the cabin pressure should remain constant, the expansion rate of the gas volume enclosed within the middle ear also remains constant, so that during the entire ascent or descent a constant feeling of discomfort is perceived by passengers without any local maximum points of the discomfiture arising. The present invention is thus capable of resolving a long-standing aim of adequately regulating the cabin pressure so as to spare the sensitive middle ear.

By integrating this regulation of the time-related pressure change to the momentary absolute cabin pressure, it is relatively easy to continue to use hardware that is already in existence in the aircraft, for example, adapting a software based control system of a cabin pressure regulator unit. This does not involve any major changes to the systems of a modern commercial aircraft, so that costs can be saved.

Moreover, the cabin pressure regulating system in accordance with the present invention may comprise at least one administration or management unit connected to the cabin pressure management unit and also to at least one sensor for determining the absolute pressure $P_C$ in the aircraft cabin, whereby the administration or management unit of the cabin pressure regulating system gives the required setting of the pressure level. This administration or management unit may be connected to a Flight Management System (FMS), which can transmit certain flight data, such as altitude or airspeed, that are necessary to prepare an efficient cabin pressure regulation or also data required for the planning of time intervals.

To a person skilled in the art, it is clear that the cabin pressure regulator unit and the administration or management unit do not necessarily need to be in the form of separate functional elements, but that they may both be combined into a single unit. An appropriate electronic data processing unit or the like may be suitable for this purpose.

According to one advantageous further development of the regulating system in accordance with the present invention, this system is set in such a way when changes occur in the cabin pressure, that the quotient of the time-related deviation dP/dt of the air pressure and the absolute air pressure $P_C$ (also known as the "discomfiture index") within the cabin remains constant and that accordingly its derivative here is possible zero. In this way, increasing discomfiture can be prevented.

The object is further achieved by a method to regulate the air pressure in an aircraft cabin and also by an aircraft having a cabin pressure regulator unit, an administration or management unit at least one air inflow system, at least one air outflow system and at least one sensor to determine the momentary absolute pressure in the aircraft fuselage.

BRIEF DESCRIPTION OF THE DRAWINGS

Further features, advantages and possible applications of the present invention will become apparent from the following description of the embodiments and from the drawings. In this respect, all the described and/or schematically represented features are, both in themselves and in any possible combination, constitute the subject-matter of the present invention, regardless of their actual composition in the individual claims or in their retroactive applications. In the figures, the same reference numbers are used for identical as for similar objects.

DETAILED DESCRIPTION OF TYPICAL EMBODIMENTS

Figure 1:
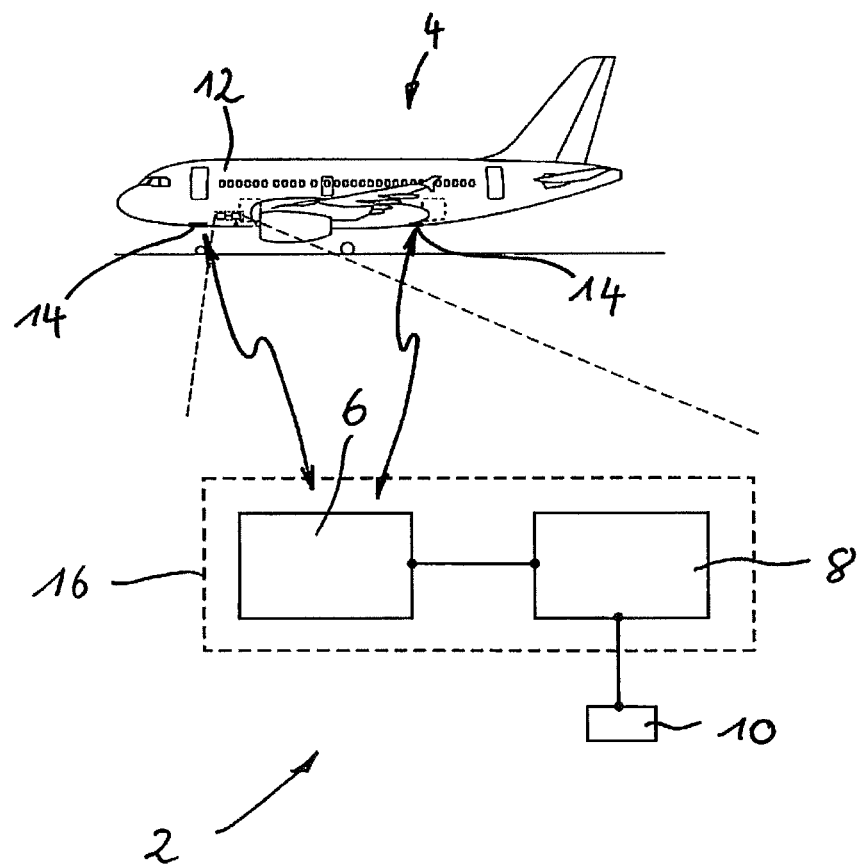
FIG. 1 shows a schematic view of the system in accordance with the present invention.

FIG. 1 shows by way of example a regulating system 2 in accordance with the present invention to regulate the cabin pressure of an aircraft 4, that comprises a cabin pressure regulator unit 6 that is connected to an administration or management unit 8. A sensor 10 supplies signals to the administration or management unit 8, showing the absolute cabin pressure $P_C$ within the fuselage 12 of the aircraft 4. Clearly, independently of the core thinking of the present invention, other sensors 10 may be arranged at different or at the same places within the aircraft fuselage 12, whereby the calculated values for the absolute $P_C$ can be averaged or compared with each other for redundancy reasons. The number and the duplication of components should not restrict the subject-matter of the present invention. Here, the aircraft 4 contains for example two further air outflow devices 14 for the controlled outlet of air from the cabin to regulate the pressure in the cabin, whereby a series of valves ("outflow valves"), for example, are arranged here in order to let the air out. At the same time, the air flowing into the controlled air introduction system into the cabin can be regulated in order to influence the pressure in the cabin.

Furthermore, the sensor 10 can alternatively be connected to the cabin pressure regulator unit 6, so that the administration or management unit 8 only indicates a pressure change rate if a climb or a descent is initiated or the start of a climbing or descending stage is indicated. It is also conceivable that the current flight altitude can be transmitted through the administration or management unit 8 to the cabin pressure regulator unit 6, so that the initiation of the ascent or the descent is identified and the cabin pressure $P_C$ can be adjusted accordingly.

According to the example of the embodiment shown in the drawing, the administration or management unit 8 always detects the momentary absolute cabin pressure $P_C$ within the fuselage 12 through the sensor 10, so that, for example, with the initiation of a climb or a descent in line with the criteria in accordance with the present invention, a change can be made in the cabin pressure $P_C$. The administration or management unit 8 may be set up in such a way that the cabin pressure regulator 6 permanently provides an air pressure level to be set, so that the quotient of the time-related deviation $dP_C/dt$ of the cabin pressure and the absolute cabin pressure $P_C$ within the cabin 12 remains constant:

$$\frac{\frac{dP_C}{dt}}{P_C} = const.$$

Alternatively, the administration or management unit 8 and the cabin pressure regulator unit 6 can be integrated in the form of a single regulator unit 16. As a further alternative, the principal functions or all of the functions indicated above may also be carried out automatically by the cabin pressure regulator unit 6.

Figure 2A:
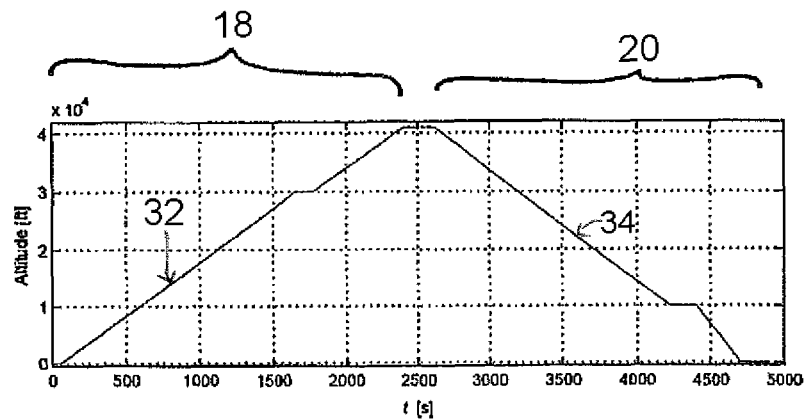
FIGS. 2a to 2c show, by way of example, a flight profile, a cabin height profile and also a deviation of the cabin height profile in accordance with the present invention from a conventional cabin height profile.

FIG. 2a shows a typical flight profile, in which the altitude shown in ft ("feet") against the time shown in s is depicted. In an initial section of time 18, the aircraft climbs to a certain cruising height, as indicated by line 32, and then in a second time section 20, it descends to ground level, as indicated by line 34. To reduce the mechanical loading on the aircraft fuselage 12 the absolute cabin pressure $P_C$ in flight within the aircraft fuselage 12 is lower than on the ground, so that the pressure difference and thereby the mechanical force acting on the fuselage 12 is reduced. As already indicated, the absolute cabin pressure $P_C$ in the fuselage can be represented by an appropriate "cabin height". It has been established that a cabin height in the region of 2,000 to 3,000 m represents a good compromise between the wellbeing of passengers and the mechanical loading of the aircraft fuselage 12, whereby the notion of "wellbeing" is intended to include an adequate supply of oxygen and a reduced fatigue factor.

Figure 2B:
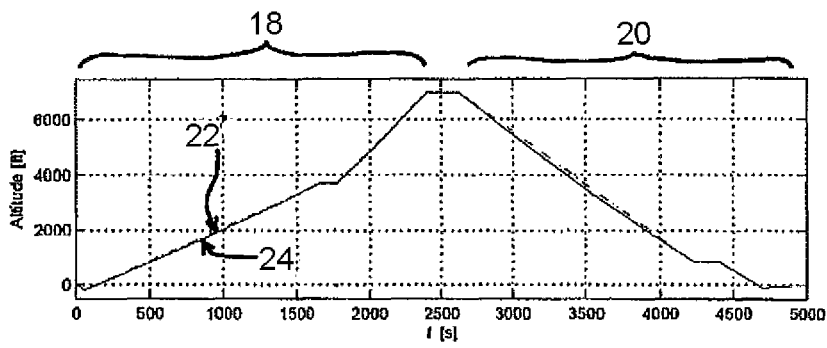
Figure 2C:
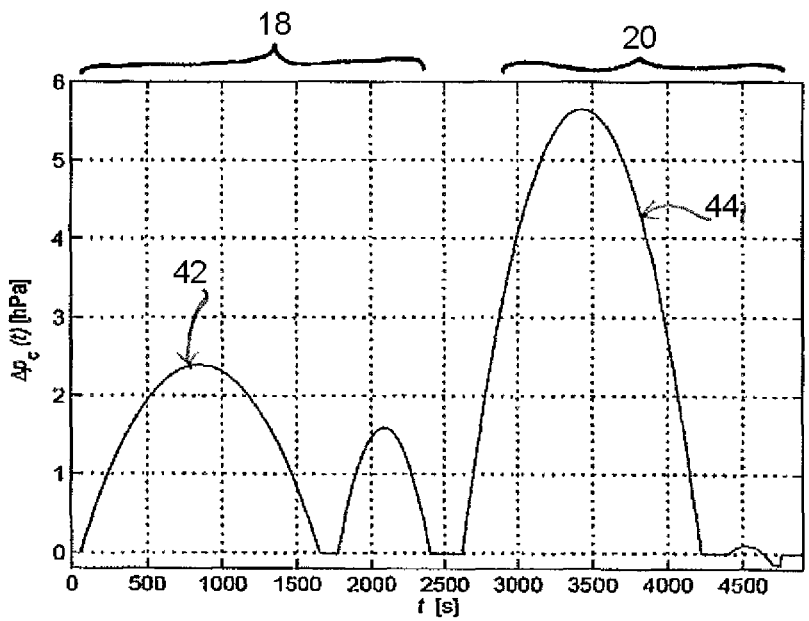

As FIG. 2b shows, the cabin height in ft is adjusted in parallel with the altitude. The broken line 22 in FIG. 2b indicates a cabin height profile of the type achieved with a regulating system 2 in accordance with the present invention. The unbroken line 24 indicates a profile generated with a conventional regulating system. Due to the—globally considered—very similar cabin pressure levels or the very similar cabin heights, FIG. 2c additionally shows diagrammatically the difference between the development of $P_C$ attained with a regulating system in accordance with the present invention and a conventional regulating system. There, in an initial time section 18, that corresponds to climbing, a maximum difference of typically ca. 2.5 mbar, as indicated by line 42, is achieved between the conventional cabin height profile 24 and the cabin height profile 22 achieved with the regulating system 2 in accordance with the present invention. This difference compensates the uneven loading (or stress) on a human ear during climbing and is clearly perceptible to the human ear. In the second time section 20, that corresponds to descending, even greater differences, for example up to a typical 5.5 mbar are achievable, as indicated by line 44, which according to Boyle's Law, is due to the high initial pressure when commencing a descent.

This adjusted pressure rate regulation in accordance with the present invention enables the gas contained within the middle ear to be continuously expanded during the entire ascent except to the typically depicted plateau levels of the height profile. This also applies to descending. No local maximum levels of gas expansion are encountered in the middle ear, so that there is no perceptible increase in the discomfiture feeling during certain phases of ascending or descending flight and no fluctuations arise.

Figure 3A:
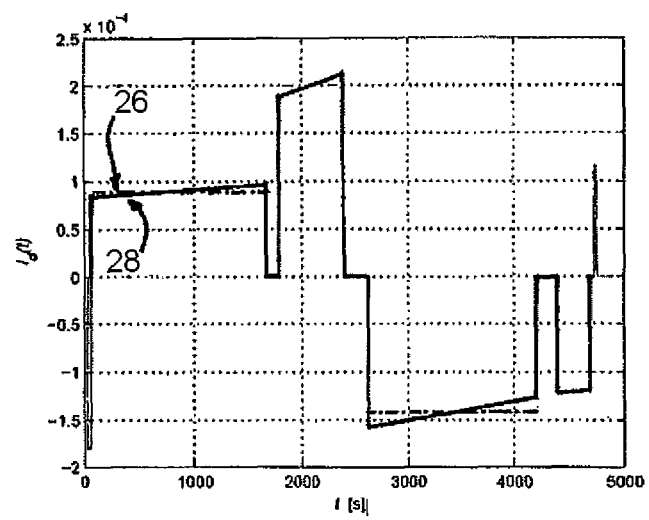
FIGS. 3a and 3b demonstrate a discomfiture index and also a time-related derivative of the discomfiture index.
Figure 3B:
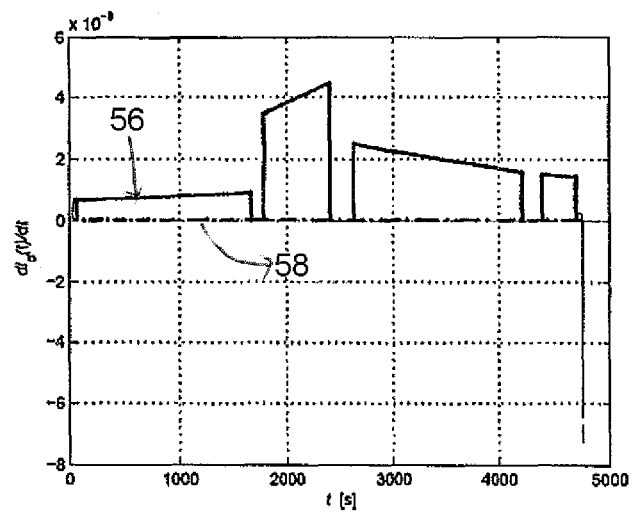

FIG. 3a shows a so-called "discomfiture index" $I_d(t)$, which can be expressed in the equation $$I_d(t) = \frac{P_C(t)}{P_C(t+dt)} - 1$$

in which $P_C(t)$ represents the absolute cabin pressure at the time t and dt is a time increment. The broken line 26 shows the discomfiture index, achieved by a regulating system 2 according to the present invention used to regulate the cabin pressure of an aircraft, while unbroken line 28 again represents the discomfiture index achieved with a conventional regulating system. It is clearly apparent that in no sections of the ascent or the descent, increasing or falling values arise between the typically existing altitude profile plateaus for the discomfiture index, but balanced uniform values are achieved for both rising and falling cabin pressures $P_C$ in the fuselage 12 of the aircraft 4. This is again clearly demonstrated in FIG. 3b, in which the time-related derivative of the discomfiture index is shown by a line 58, whereas the same for the conventional system is shown by a line 56. Disregarding discontinuities during take-off and landing it is zero, i.e. no reduction in comfort for passengers with the regulating system 2 in accordance with the present invention.

Finally, it should be noted that the terms "having/comprising" are not intended to preclude other elements or steps and that "a/an" does not preclude a plural form. It is also noted that features or steps, described by means of references to one of the above embodiments, can also be used in combination with other features or steps of other embodiments described above. Reference numerals contained in the claims are not to be seen as being a limitation.

References
2 Regulating system in accordance with the present invention
4 Aircraft
6 Cabin pressure regulator unit
8 Administration or Management unit
10 Sensor for $P_C$
12 Aircraft fuselage
14 Air outflow device
16 Regulator unit
18 First time section (climbing)
20 Second time section (descending)
22 Cabin height profile in accordance with the present invention
24 Conventional cabin height profile
26 Discomfiture index in accordance with the present invention
28 Conventional discomfiture index

The invention claimed is:

1. A regulating system for regulating an absolute cabin pressure $P_c$ of an aircraft, the system comprising:
at least one cabin pressure regulator unit, which is so configured that, by controlling at least one of an air outflow device and an air inflow device of the aircraft, the regulator unit can adjust the absolute cabin pressure $P_c$ within a fuselage of the aircraft, which fuselage is supplied with fresh air and subjected to pressure, to a predetermined pressure level indicated by the cabin pressure regulator unit, or the regulator unit can set a predetermined cabin height and,
when changes of the pressure level or the cabin height have to be made, a quotient of the time-related deviation $dP_c/dt$ of the absolute cabin pressure $P_c$ in the fuselage of the aircraft and the absolute cabin pressure $P_c$ can be kept constant.

2. The regulating system according to claim 1, further comprising at least one administration or management unit connected to the cabin pressure regulator unit and to at least one sensor to determine the absolute cabin pressure $P_c$ in the aircraft cabin, wherein the administration or management unit is set up in such a way that it can indicate to the cabin pressure regulator the pressure level or the cabin height to be selected.

3. The regulating system according to claim 1, wherein the management unit is so configured that it can indicate the pressure level or the cabin height in the form of a pressure profile or in form of a cabin height profile.

4. The regulating system according to claim 1, in which the cabin pressure regulator unit is so configured that it can minimise the derivative of a discomfiture index $I_d(t)$ defined by the following equation:

$$I_d(t) = \frac{P_C(t)}{P_C(t+dt)} - 1.$$

5. A method for regulating an absolute cabin pressure $P_c$ of an aircraft, comprising:
detecting, by a sensor, the absolute cabin pressure $P_c$;
controlling, by a cabin pressure regulator unit, at least one of an air outflow or an air inflow device of the aircraft to adjust the absolute cabin pressure $P_c$ within an aircraft fuselage that is supplied with fresh air and subject to loading at a predetermined pressure level; and if changes to the absolute cabin pressure $P_c$ are demanded, maintaining, by the cabin pressure regulator unit, a quotient of the time-related deviation $dP_c/dt$ of the absolute cabin pressure $P_c$ in the fuselage of the aircraft and the absolute cabin pressure $P_c$ constant.

6. The method according to claim 5, whereby if changes to the absolute cabin pressure $P_c$ are demanded, the derivative of a discomfiture index $I_d(t)$ defined by the following equation $$I_d(t) = \frac{P_C(t)}{P_C(t+dt)} - 1$$

is minimized.

7. An aircraft, comprising:
at least one of an air outflow or an air inflow device,
at least one sensor to detect an absolute cabin pressure $P_c$ and
at least one regulating system having at least one cabin pressure regulator unit, that is so configured that, by controlling the air outflow or air inflow device, the at least one regulating system can set the absolute cabin pressure $P_c$ within an aircraft fuselage, which is supplied with fresh air and subjected to pressure, at a pressure level or a cabin height indicated by the cabin pressure regulator unit and,
if changes are demanded to the pressure level or the cabin height, the at least one regulating system can maintain a quotient of the time-related deviation $dP_c/dt$ of the absolute cabin pressure $P_c$ in the fuselage of the aircraft and the absolute cabin pressure $P_c$ constant.

* * * * *